United States Patent [19]

Tyutinman

[11] Patent Number: 5,382,008
[45] Date of Patent: Jan. 17, 1995

[54] SHOCK ABSORBING SUSPENSION

[76] Inventor: Adolf Tyutinman, 2983 Cambridge Dr., San Jose, Calif. 95125

[21] Appl. No.: 177,464

[22] Filed: Jan. 5, 1994

[51] Int. Cl.[6] .................................................. F16F 1/14
[52] U.S. Cl. ...................................... 267/154; 267/136; 52/167.4; 248/584
[58] Field of Search ............... 267/153, 154, 136, 273; 52/167 R, 167 RM, 167 CB; 248/580, 584, 590; 280/688, 721

[56] References Cited

U.S. PATENT DOCUMENTS

| | | | |
|---|---|---|---|
| 3,795,392 | 3/1974 | Nemec | 267/153 |
| 5,233,797 | 8/1993 | Uno et al. | 52/167 RM |
| 5,288,060 | 2/1994 | Tyutinman | 267/154 |

FOREIGN PATENT DOCUMENTS 634359  8/1936  Germany ............................ 267/273

*Primary Examiner*—Robert J. Oberleitner
*Assistant Examiner*—Lee W. Young

[57] ABSTRACT

A shock absorbing suspension comprises a pair of parallel, spaced mounting plates (12), pairs of counter-rotating D-frames (13). Pair of frames is slidably attached to the inner side of the mounting plate 12' by two grippers 14 of the mounting plate 12 by two grippers 19. Resistance mechanism (65 and 66) are mounted on each gripper for substantially resisting the rotation of each individual frame in one direction only, such that the suspension will substantially resist being compacted together, but can be freely extended apart. In one application, the bottom mounting plate is attached to the ground, while the top mounting plate is attached to and supports a building. When at rest, the resistance mechanisms will provide enough resistance to allow the suspension to support the building without being compacted. When the ground jolts upwardly in an earthquake, the suspension will be compacted to absorb the upward motion of the ground. But, when the ground jolts downwardly, the suspension will freely extend. As a result, the suspension will safely isolate the building from the violent ground movements.

6 Claims, 3 Drawing Sheets

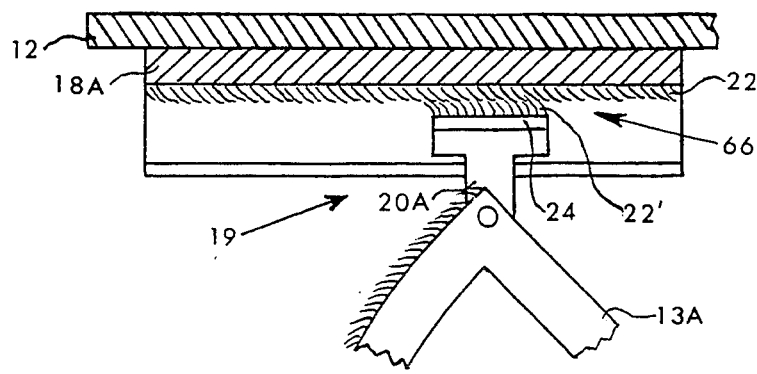
FIG. 6
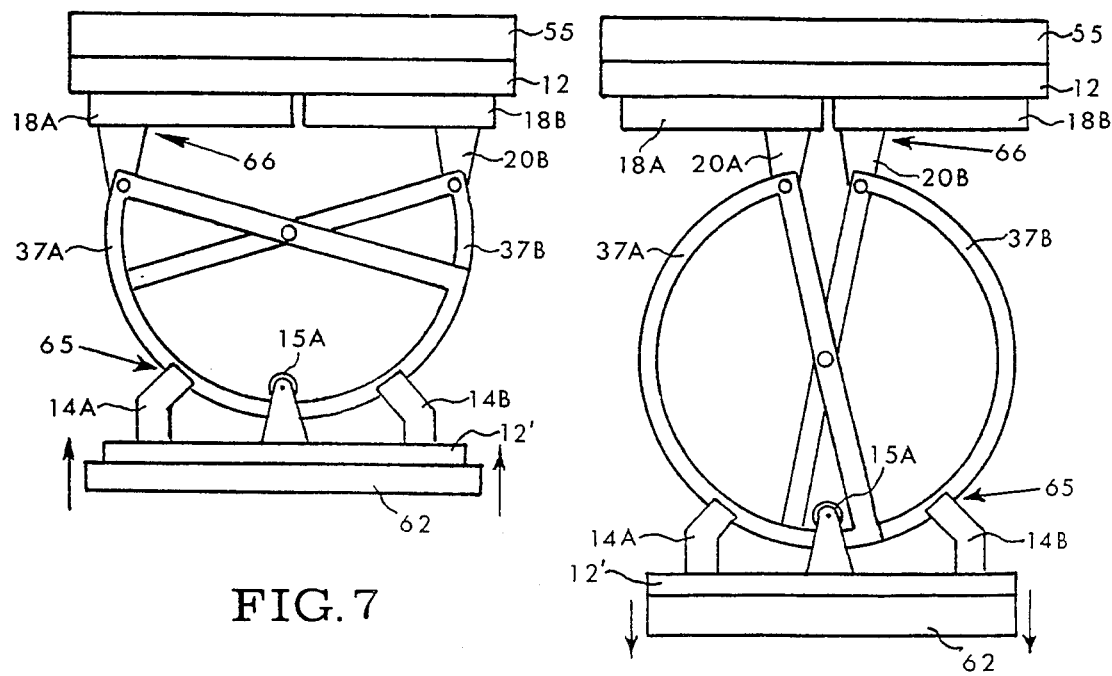
FIG. 7
FIG. 8

SHOCK ABSORBING SUSPENSION

FIELD OF THE INVENTION

This invention relates generally to energy absorbing devices, specifically to a shock absorbing suspension suitable for use in a wide variety or applications. This invention is another simplified variation of my previous invention U.S. Pat. No. 5,288,060, issued Feb. 22, 1994.

BACKGROUND OF THE INVENTION

The cabins of moving automobiles need to be isolated from the jarring movements of their wheels, so that they will remain relatively stable even though the wheels are jarred by road irregularities. Buildings located in dangerous earthquake areas such as California and Japan are subject to destructive ground movements. Therefore it would be desirable if the buildings could be made to remain stable and upright even though the ground beneath them jolts in different directions. As a result, a variety of suspensions and shock absorbers have been designed to meet these needs.

Most motor vehicle suspensions share a common configuration. U.S. Pat. No. 5,016,911 to Takehara, et al. (1991) shows a typical motor vehicle suspension. It consists of an arm for locating the wheel relative to the vehicle body, a spring for supporting the weight of the body and absorbing the energy imparted to the wheel by the road, and a damping strut for dampening the motions of the wheel. Although widely used, this configuration requires separate locating, energy absorbing, and damping components. In addition, the pivot arm causes the wheel to move up and down along an arc, so that the tire cannot maintain optimum contact with the road surface. Furthermore, the suspension travel is quite short, so that it is inadequate for fully absorbing the effects of very large bumps and pot holes.

A greater variety of designs exist for building shock absorbers. U.S. Pat. No. 5,134,818 to Parera (1992) shows a shock absorber comprising a number of vertical spring rods arranged in a cylinder embedded in the foundation. The rods support the weight of the building, which compresses tile rods so that they bow radially outwardly. When the ground moves downward during an earthquake, tile rods will extend slightly as they straighten so that they maintain the stability of the building. However this device has very limited travel, mainly in the vertical direction, so that it is capable of absorbing only very minor ground movements, and is not very effective for the main type of earthquake movement, which is horizontal.

U.S. Pat. No. 5,103,605 to Sul (1992) shows another building shock absorber comprising a number of coil springs for supporting a building and isolating it from vertical and lateral ground displacements. The springs are mounted ill a box slidably disposed on a pan. The pan is attached to the ground, so that when the ground jolts laterally during an earthquake, the pan will be free to slide about horizontally under the box, so that the building will remain stationary. Relatively large vertical ground displacements can be absorbed by the long coil springs. However, this device lacks a damping mechanism, so that the springs can allow the building to oscillate even after the ground movements subside.

Another type of building shock absorber is shown in U.S. Pat. No. 4,235,317 to Maciejewski (1980). It comprises a series of telescoping tubes with spring loaded sealing gaskets. The tubes are filled with an energy absorbing medium for absorbing the energy of very strong shocks. Because of the telescoping design, this device can absorb large displacement vibrations. However, it is much like the damping strut commonly used in motor vehicles, so that it cannot support the static weight of an object by itself. Therefore, it must be used in conjunction with other mechanisms such as locating arms, springs, etc.

In conclusion, conventional motor vehicle suspensions offer limited travel, so that they are unable to absorb large irregularities on road surfaces. They also cause the wheels to move in vertical arcs, such that tile tires cannot maintain optimum contact with the road. Furthermore, they require separate components for locating the wheels, absorbing impacts and dampening vibrations. Existing building shock absorber designs either offer very limited travel, so that they can only absorb minor quakes, cannot absorb horizontal shocks, or lack damping mechanisms to prevent continued oscillations of tile building after the end of an earthquake.

SUMMARY OF THE INVENTION

Accordingly, a primary object of the invention is to provide an improved shock absorbing suspension. Additional objects and advantages are to provide a shock absorbing suspension which can support the weight of an object above a supporting surface, which extends and contracts in a linear direction, which can isolate the object from small as well as very large displacements of the supporting surface, which can isolate the object from lateral as well as vertical displacements of the supporting surface, which singularly performs the functions of locating the supported object, absorbing the energy of the moving supporting surface, and dampening vibrations, which can be made to support a variety of objects of different sizes, weight, and in a variety of applications.

Further objectives and advantages will become apparent from a study of the following description and the accompanying drawings.

In a preferred embodiment of tile invention, a shock absorbing suspension comprises a pair of widely spaced rectangular mounting plates. One of the plates is attached to the supporting surface or object such as a building foundation or a wheel of a motor vehicle, while the other is attached to the object to be supported such as a building or the body of a motor vehicle, respectively. The supported object is thus located by the suspension relative to the supporting surface. Pairs of semi-circular frames are located between the plates. The semi-circular frames arc rotatably connected together at the axes of the frames. Pairs of frames are attached to the plates by grippers and rollers which slidably hold the frames along their curved portions, such that the frames are free to rotate about their axes. The semi-circular frames allow the mounting plates to be moved far apart or close together. Resistance devices located on the grippers cause the semi-circular frames to resist rotation in one predetermined direction only. As such, the suspension will resist being compacted or compressed upwardly by the supporting surface or object to act as a shock absorber and damper, while it will freely extend to allow the supporting surface or object to fall downwardly away.

When used on a motor vehicle, the shock absorbing suspension acts to locate each wheel relative to the body of the vehicle. Because it resists being compacted, it will support the weight of the vehicle when it is at rest. When the vehicle is in motion, and the wheel encounters a bump, the suspension will absorb the energy imparted to the wheel by the bump and dampen any oscillations. As the wheel travels over and away from the bump, the wheel will be caused by gravity to fall downward such that suspension will extend back to its initial position.

The shock absorbing suspension may be used in a wide variety of applications. In addition to being used as a suspension for motor vehicles, it may also be used, for example, to isolate buildings and boat cabins from the motions of the ground and sea, respectively.

BRIEF DESCRIPTION OF THE DRAWINGS

FIG. 6 is a front view of the second resistance mechanism of FIG. 1.

FIG. 7 is a front view of the shock absorbing suspension in full compression.

FIG. 8 is a front view of the shock absorbing suspension in full extension.

Figure 1:
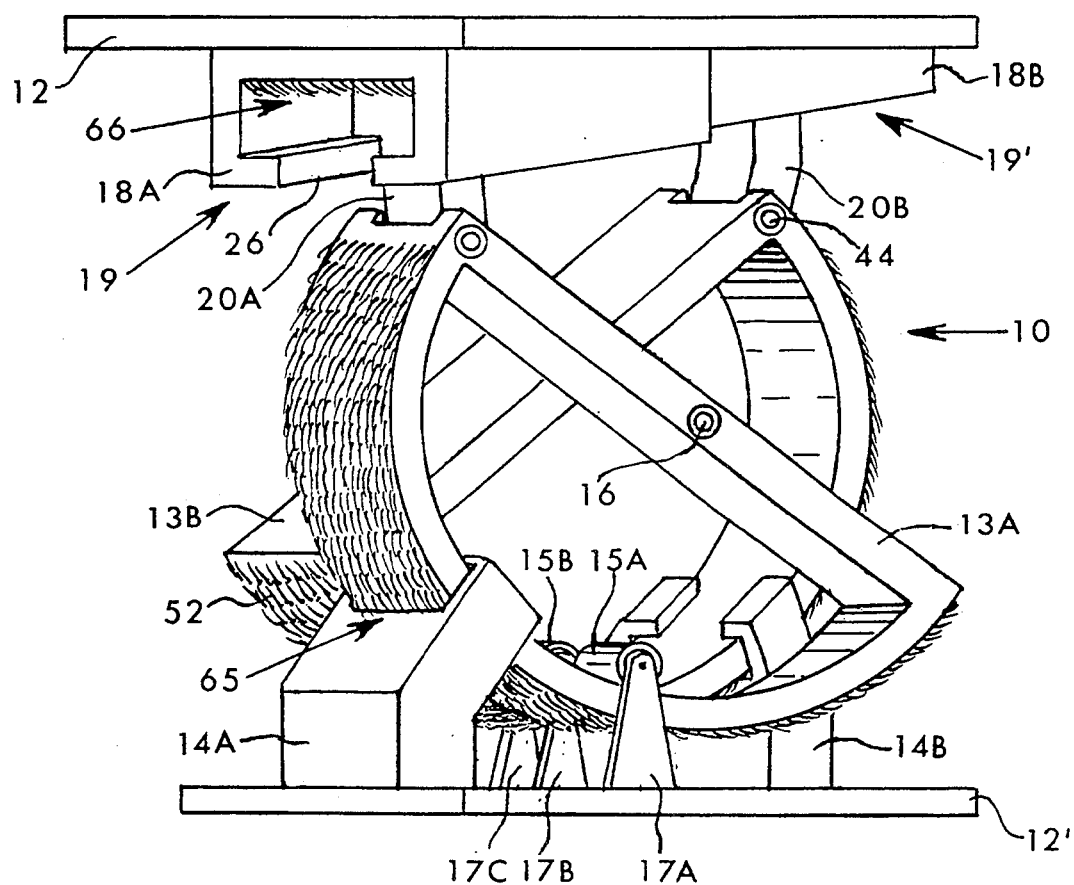
FIG. 1 is a front perspective view of a shock absorbing suspension containing a pair of D-frames in accordance with a preferred embodiment of the invention.

Drawing Reference Numerals
10. Assembly
12. Mounting Plate
13. D-Frame
14. First gripper
15. Rollers
16. Axle
17. Arms
18. Hollow Bar
19. Second Gripper
20. Brake Shoe
22. Fabric
24. Square Plate
26. Slot
33. Rib
35. Ball Bearing
36. Hub
37. D-Frame
50. Gripper
51. Square Plate
52. Fabric
53. D-Frame
55. Load
62. Supporting Object
65. Resistance Mechanism
66. Resistance Mechanism

DESCRIPTION FIGURE 1—OVERALL SUSPENSION

In accordance with a preferred embodiment of the invention shown in FIG. 1, a shock absorber comprises an Assembly 10. The assembly can be compacted close together (FIG. 7) or extended far apart (FIG. 8).

Assembly 10 comprises a pair of mounting plates 12 and 12', a pair of D-frames, 13A and 13B, a first pair of grippers, 14A and 14B, a second pair of grippers which comprise a pair of hollow bars, 18A and 18B, and a pair of brake shoes, 20A and 20B, a pair of rollers, 15A and 15B. D-frames 13A and 13B are both in the shape of an extruded "D." On the outer surfaces of their curved sides cover piece of fabric 52, which on D-frame 13A pointed counter clockwise (CCW), but clockwise (CW) on D-frame 13B. (The frames form parts of imaginary circles which are concentric about a common axis 161. The frames are rotatably attached together by an axle 16, which extends through the straight sides of each "D" of the frames. D-frames 13A and 13B are movably held under Plate 12 with their curved sides toward the Plate 12' by inwardly first pair curving Grippers 14A and 14B, respectively, attached at the outer corners of Plate 12'. Plate 12' is also connected to the lowest sides of the frames by Rollers 15A and 15B. The rollers are connected to Plate 12' by Arms 17A, 17B, and 17C, which will be explained later in connection with FIG. 4. D-frame has two ends—upper end and lowest end. Second pair of Grippers 19, including pair of Brake shoes 20A and 20B, attached at the upper ends D-frames 13A and 13B inclusive, and pair Hollow bars 18A and 18B attached at the lowest side Plate 12. The said Hollow Bars have slot 26. The said Brake shoes 20A and 20B moved inside in the Hollow Bars 18A and 18B, inclusive.

DESCRIPTION—FIGURES 2 AND 3—FRONT VIEW

Figures 2, 3:
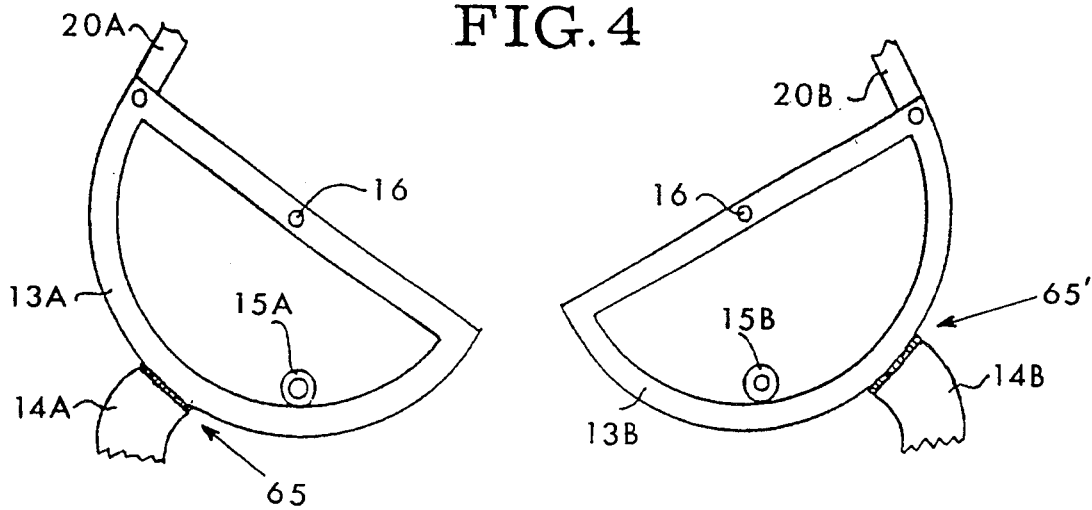
FIGS. 2 and 3 are front views of the D-frames used in the suspension of FIG. 1.

FIG. 2 shows a front view of D-frame 13A. Gripper 14A (FIG. 1) is in moving engagement with the outward surface of D-frame 13A, while Roller 15A is in rolling engagement with the inner surface of the D-frame.

FIG. 3 shows a front view of D-frame 13B. Gripper 14B (FIG. 1) is in moving engagement with the outward surface of D-frame 13B, while Roller 15B is in rolling engagement with the inner surface of the frame.

Because D-frames 13A and 13B are rotatably connected by Axle 16, their curved portions form parts of imaginary concentric circles. Therefore, D-frame 13B is held and constrained directly by Gripper 14B and Roller 15B, and indirectly by Resistance Mechanism 65 and Roller 15A; while D-frame 13A is held and constrained directly by Resistance Mechanism 65 and Roller 15A and indirectly by Gripper 14B and Roller 15B.

DESCRIPTION—FIGURE 4—ROLLERS

Figure 4:
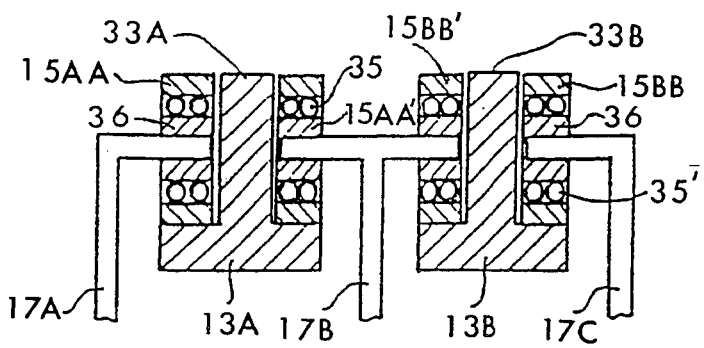
FIG. 4 is a right-side sectional view of another embodiment of the rollers used in the suspension of FIG. 1.

In lieu of Rollers 15A and 15B (FIG. 1), alternative rollers 15AA and 15BB can be provided as shown in FIG. 4 in a right side partial sectional view. These alternative rollers are narrower than Rollers 15A and 15B (FIG. 1). D-frames 13A and 13B are shown with optional Reinforcing Ribs 33A and 33B, respectively. Arms 17A and 17C are L-shaped, while Arm 17B is in the shape of an inverted "T". The top or proximal ends of the arms are attached to tile upper side of mounting plate 12 (FIG. 1). Rollers 15AA and 15BB are disposed at tile distal ends of arms 17A and 17C, respectively, such that they are in rolling engagement with the inner side of D-frames 13A and 13B, respectively. The optional "T" cross sections of the frames necessitate additional rollers 15AA' and 15BB' (Not shown in FIG. 1) to be disposed on the horizontal distal ends of arm 17B such that they are in rolling engagement with the inner surfaces of D-frames 13A and 13B, respectively. All the rollers have internal ball bearings 35 disposed around hubs 36.

DESCRIPTION—FIGURE 5—FIRST RESISTANCE MECHANISM

Figure 5:
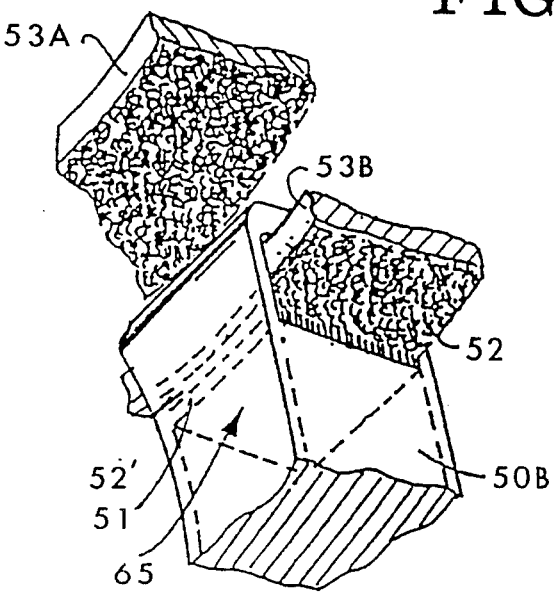
FIG. 5 is a right-side sectional view of the first resistance mechanism of FIG. 1.

FIG. 5 illustrates a method of creating directional resistance for the D-frames. A D-frame 53B is slidably disposed within a gripper 50B having a square plate 51 mounted within. A piece of fabric 52 having stiff fibers matted clown tightly and oriented in a CW direction is attached to the outer surface of the D-frame. Fabric 52 is similar to the type of material commonly used in lint brushes for clothing. A similar piece of fabric 52' is attached to the underside of plate 51, but with the fibers pointed in a CCW direction. D-frame 53B and plate 51 are positioned such that the pieces of fabric 52 and 52' are compressed therebetween. Because the stiff fibers of fabric 52 and 52' are oriented toward each other, they will cause D-frame 53B to strongly resist CW rotation, but be easily rotatable CCW.

Fabric 52 and 52', and square plate 51 comprise the resistance mechanism 65 for D-frame 53B. In this embodiment, other D-frames arc similarly equipped with additional resistance mechanisms 65. Fabric 52 and 52' can be made of other materials such as fine metal bristles.

DESCRIPTION—FIGURE 6—SECOND RESISTANCE MECHANISM

FIG. 6 illustrates a method of creating directional resistance for the D-frames. Gripper 19 including the hollow bar 18 and brake shoe 20. The hollow bar 18A has a piece of fabric 22 attached toward lowest side inside of it. A piece of fabric 22 having stiff fibers matted clown tightly and oriented in a CCW direction. The brake shoe 20A is slidably disposed within a hollow bar 18A, having a square plate 24. A similar piece of fabric 22' is attached to the upper side of plate 24, but with the fibers pointed in a CW direction. Hollow bar 18A and plate 24 are positioned such that the pieces of fabric 22 and 22' are compressed therebetween. Because the stiff fibers of fabric 22 and 22' are oriented toward each other, they will cause brake shoe 20A to strongly resist from right to left direction, but be easily moved from left to right direction.

Fabric 22 and 22' and square plate 24 comprise the resistance mechanism 66 for D-frame 13A. In this embodiment, other D-frame 13B is similarly equipped with additional resistance mechanism 66'.

OPERATION—FIGURE 7—COMPRESSION

The operation of all embodiments of tile suspension are similar. The operation of the embodiment of FIG. 7 will be discussed here as an example. A load 55 is attached to the top of mounting plate 12. Load 55 can be anything the suspension can support and isolate from shock and vibrations, including the body of a motor vehicle, a building, etc. The entire suspension rests on top of a support object 62, which can be a foundation if load 55 is a building. In the case of a building, many suspensions should be installed at the main support points of the building, as shown in the previously cited building shock absorber patents. In the case of a motor vehicle, the suspension will be installed between the wheel's axles and the wheel wells, in place of the conventional suspension parts.

When load 55 and supporting object 62 are at rest, the amount of resistance offered by resistance mechanisms 65 and 66 are enough to prevent all D-frames 37 from rotating, and the suspension from being compressed. Therefore, the suspension is maintained in an intermediate position similar to that shown in FIG. 1. The amount of resistance offered by resistance mechanism 65, of the other embodiments of the suspension, is carefully chosen for each type of load 55. For example, the resistance should be less for relatively light loads such as motor vehicles, but much higher for very heavy loads such as buildings.

When foundation or supporting object 62 jolts upward during an earthquake, as indicated by the arrows, the compression exerted on the suspension by the inertia of load 55 and the force of the upward movement of supporting object 62 will overcome the resistance provided by resistance mechanisms 65 and 66. Therefore, supporting object 62 will force D-frame 37A to rotate CCW, and D-frame 37B to rotate CW. As a result, the suspension will be compressed as shown in FIG. 7. The energy of object 62 being absorbed. The inertia of load 55 will cause the load to remain relatively motionless, such that the load will be isolated from the upwardly movement of building foundation or support object 62. The stability and safety of load 55 is thus maintained.

OPERATION—FIGURE 8—EXTENSION

When the foundation or supporting object 62 jolts downwardly, as indicated by the arrows, directional resistance mechanisms 65 and 66 offer little resistance to allow D-frame 37B to easily rotate CCW, and D-frame 37A to easily rotate CW. As a result, the suspension will be automatically and easily pulled by the downwardly moving supporting object 62 to the fully extended position shown.

The suspension's cycles of compression and extension will repeat as long as support object 62 continues to jolt up and down. As a result, the suspension will reliably isolate load 55 from the jarring movements of supporting object 62 to ensure its stability and safety.

I claim:

1. A suspension comprising:
    a first mounting means and a second mounting means spaced apart from each other by a variable distance, such that said first mounting means and said second mounting means can be compacted together and extended apart,
    a plurality of frames positioned between said first mounting means and said second mounting means, said frames being concentrically and rotatably mounted about an axis, and
    a gripping means for slidably gripping said frames, said gripping means comprising
        a first pair of gripping means attached to said first mounting means, and
        a second pair of gripping means attached to said second mounting means, said second pair of gripping means including at least one hollow bar and at least one brake shoe, said brake shoe moving inside said hollow bar,
    whereby said first mounting means and said second mounting means will substantially resist being compacted together, but can be easily extended apart.

2. The suspension of claim 1 wherein said frames are semi-circular.

3. The suspension of claim 1 wherein said said first pair of gripping means includes at least one roller for rotatably engaging one of said frames.

4. A suspension comprising:

a pair of mounting means spaced apart by a variable distance, such that said pair of mounting means can be compacted together or extended apart, at least one pair of frames positioned between said pair of mounting means, said frames being concentrically and rotatably mounted about an axis, and a first pair of gripping means and a second pair of gripping means, said first pair and said second pair attached to said pair of mounting means and slidably gripping said frames, said first pair of gripping means including directional resistance means for resisting counter-rotation of said frames, said second pair of gripping means including at least one hollow bar and at least one brake shoe, said brake shoe moving inside said hollow bar, whereby said pair of mounting means will substantially resist being compacted together, but can be easily extended apart.

5. The suspension of claim 4 wherein said frames are semi-circular.

6. The suspension of claim 4 wherein said said first pair of gripping means includes at least one roller for rotatably engaging one of said frames.

* * * * *